(12) United States Patent
Willis

(10) Patent No.: US 7,561,729 B2
(45) Date of Patent: Jul. 14, 2009

(54) IMAGE BASED MEASUREMENT SYSTEM AND METHOD FOR MEASURING DYNAMIC OBJECTS

(75) Inventor: Jeffrey J. Willis, North Somerset (GB)

(73) Assignee: Rolls-Royce plc, London (GB)

( * ) Notice: Subject to any disclaimer, the term of this patent is extended or adjusted under 35 U.S.C. 154(b) by 979 days.

(21) Appl. No.: 10/848,127

(22) Filed: May 19, 2004

(65) Prior Publication Data
US 2005/0008214 A1 Jan. 13, 2005

(30) Foreign Application Priority Data
Jul. 11, 2003 (GB) .................... 0316346.6

(51) Int. Cl.
*G06K 9/00* (2006.01)
*G06K 9/62* (2006.01)
(52) U.S. Cl. ..................... 382/141; 382/209
(58) Field of Classification Search .............. 382/141, 382/144, 145, 209, 217, 203, 151, 152
See application file for complete search history.

(56) References Cited

U.S. PATENT DOCUMENTS

| | | | | |
|---|---|---|---|---|
| 3,794,001 A * | 2/1974 | Birch et al. | ............... | 123/41.05 |
| 4,995,087 A * | 2/1991 | Rathi et al. | ............... | 382/152 |
| 5,140,494 A * | 8/1992 | Slade | .................. | 361/212 |
| 5,333,208 A * | 7/1994 | Massen | ............... | 382/111 |
| 5,353,356 A * | 10/1994 | Waugh et al. | ............ | 382/143 |
| 5,822,450 A * | 10/1998 | Arakawa et al. | ............. | 382/152 |
| 6,035,696 A * | 3/2000 | Kiefer et al. | ................ | 73/1.82 |
| 6,072,915 A * | 6/2000 | Tanaka | ............... | 382/287 |
| 6,341,153 B1 * | 1/2002 | Rivera et al. | .............. | 378/4 |

(Continued)

FOREIGN PATENT DOCUMENTS

GB A 2 150 284 6/1985

(Continued)

OTHER PUBLICATIONS

Altenkrich et al. "Robotic Sample Maniuplation for Stress and Texture Determination on Neutro and Synchrotron x-Ray Diffractometers" Nuclear Insturments and Method in Physics REsearch Aug. 16, 2007, pp. 428-435.*

(Continued)

*Primary Examiner*—Andrew W Johns
*Assistant Examiner*—Mia M Thomas
(74) *Attorney, Agent, or Firm*—Oliff & Berridge, PLC

(57) ABSTRACT

The present invention provides an image-based measurement system or method wherein there is provided (101) an active image of a subject of measurement, showing the subject when active or in use, and there is provided (104, 105) a reference image of the subject of measurement, the reference image being of an image type different from the active image, and wherein the reference image and the active image are combined (106), matched in scale and keyed together, and measurement (107) of the active image relative to the reference image is effected to provide measurements of dimensions of components and/or spacings between components of the subject of measurement, when active or in use. The invention further provides an image-based measurement system or method in which active images of a subject of measurement can be used to derive a reference image, for example a CAD design image.

28 Claims, 12 Drawing Sheets

U.S. PATENT DOCUMENTS

| | | | |
|---|---|---|---|
| 6,355,928 B1 * | 3/2002 | Skinner et al. | 250/269.1 |
| 6,366,689 B1 * | 4/2002 | Rao et al. | 382/145 |
| 6,575,011 B1 * | 6/2003 | Busby et al. | 73/7 |
| 6,618,689 B2 * | 9/2003 | Knorpp et al. | 702/170 |
| 6,621,928 B1 * | 9/2003 | Inagaki et al. | 382/199 |
| 6,640,003 B1 * | 10/2003 | Yabe | 382/151 |
| 6,683,641 B1 * | 1/2004 | MacCracken et al. | 348/82 |
| 6,692,222 B2 * | 2/2004 | Prinz et al. | 415/14 |
| 6,748,112 B1 * | 6/2004 | Nguyen et al. | 382/203 |
| 6,778,681 B2 * | 8/2004 | Garms et al. | 382/100 |
| 6,868,359 B2 * | 3/2005 | Raab | 702/150 |
| 7,092,484 B1 * | 8/2006 | Jensen et al. | 378/41 |
| 7,092,843 B2 * | 8/2006 | Moore et al. | 702/179 |
| 7,283,657 B1 * | 10/2007 | Carlson | 382/141 |
| 2001/0055424 A1 * | 12/2001 | Publicover | 382/195 |
| 2002/0095267 A1 * | 7/2002 | Knorpp et al. | 702/170 |
| 2003/0103674 A1 * | 6/2003 | Publicover | 382/215 |
| 2004/0051795 A1 * | 3/2004 | Ajioka | 348/239 |
| 2004/0165760 A1 * | 8/2004 | Veneruso | 382/141 |
| 2008/0025593 A1 * | 1/2008 | Ajioka | 382/141 |

FOREIGN PATENT DOCUMENTS

| | | |
|---|---|---|
| JP | 61-003005 | 1/1986 |
| JP | A 7-159133 | 6/1995 |
| JP | A 8-278109 | 10/1996 |
| JP | A 10-227619 | 8/1998 |
| JP | A 10-232937 | 9/1998 |
| JP | A-2003-109017 | 4/2003 |

OTHER PUBLICATIONS

Brinksmeier et al. "Advanced Mechatronic Technology for Turbine Blades Maintenance" Institute for Material Science (IWT) Germany, Mar. 30, 1998, IEE pp. 184-189.*

Schillinger "Proposed combination of CAD data Discrete Tomography for the Detection of Coking and Lubricants in Turbine Blades or Engines" Electronic Notes in Discrete Mathematics 20 (2005) pp. 493-499.*

Zielinski et al. "Non contact Vibration Measurements on compressor rotor blades" Meas. Sci Technology 11 (2000) pp. 847-856—DaimletChrysler Company.*

* cited by examiner

A

A

| | X001 | X002 | X003 | X004 | X005 | X006 |
|---|---|---|---|---|---|---|
| 8705 | -0,08 | 0,02 | -0,10 | -0,08 | -0,10 | -0,08 |
| 8708 | 0,15 | 0,15 | 0,16 | 0,73 | 0,34 | 0,31 |
| 8709 | -0,92 | -0,53 | -0,79 | 0,68 | -0,84 | -0,75 |
| 8710 | -0,45 | -0,44 | -0,49 | 0,77 | -0,39 | -0,36 |
| 8711 | 0,10 | -0,14 | 0,07 | 1,09 | 0,14 | 0,13 |
| 8712 | -0,79 | -0,77 | -0,61 | 0,65 | -0,44 | -0,36 |
| 8713 | -0,85 | -1,06 | -0,77 | 0,59 | -0,54 | -0,71 |
| 8714 | -1,07 | -0,99 | -1,09 | 0,45 | -0,96 | -0,93 |
| 8715 | -1,40 | -1,26 | -1,36 | 0,26 | -1,18 | -1,24 |
| 8716 | -1,89 | -1,72 | -1,91 | -0,29 | -1,75 | -1,67 |

| | %NL | %NH | CONDITION | X004 | | X006-X004 |
|---|---|---|---|---|---|---|
| 8705 | 0,00 | 0,00 | COLD STATIC | | | 0,00 |
| 8708 | 39,20 | 67,20 | IDLE | | | -0,42 |
| 8709 | 95,00 | 95,30 | 95% NL | | | -1,43 |
| 8710 | 85,10 | 91,40 | 85% NL | | | -1,13 |
| 8711 | 75,00 | 85,80 | 75% NL | | | -0,96 |
| 8712 | 90,00 | 93,60 | 90% NL | | | -1,01 |
| 8713 | 96,60 | 96,50 | MAX DRY | | | -1,30 |
| 8714 | 96,60 | 96,70 | MIN R/H | | | -1,38 |
| 8715 | 96,60 | 96,40 | 50% R/H | | | -1,50 |
| 8716 | 96,60 | 96,50 | MAX R/H | | | -1,38 |

Fig. 10

IMAGE BASED MEASUREMENT SYSTEM AND METHOD FOR MEASURING DYNAMIC OBJECTS

The present invention relates to image-based measurement, and in particular to systems and methods for carrying out measurements based on images of mechanical systems.

One example of a type of measurement which is required to be carried out accurately is tip clearance measurement in turbines and compressors. A particularly critical problem is that of tip clearance measurement in gas turbine aero engines. The clearance between the blade tips and the surrounding casing or shroud changes primarily due to alterations in thermal and mechanical loads on the rotating and stationary structures of the engine between different operating points of the engine when the engine is active or running. Maintaining appropriate tip clearances which comply with design parameters, through all operating points of the engine, is extremely important with regard to engine efficiency and performance, maintenance costs and safety. The ability to measure tip clearances in an engine, in an active or running condition, is therefore of great importance.

Tip clearance measurement with an active or running engine has typically been effected through the use of capacitance probes, installed for example in a special casing or shroud surrounding the blade tips, and using detection of changes of capacitance to estimate changes of distance between probe and blade tips at different operating points of the engine. The probe provides an analog voltage output signal which, typically using a $5^{th}$ order polynomial, is converted to a distance or clearance. An 8 to 10 mm diameter probe provides for example an analog voltage signal in the zero to ten volts range which can be converted, using millivolt intervals and a $5^{th}$ order polynomial, to indicate distances or clearances in the range 0 to 5 mm, possibly to two decimal places, although sensitivity is extremely non-linear.

However, the use of capacitance probes involves significant disadvantages. For example, capacitance probes are invasive and need specially produced engine components, eg a special casing or shroud. The production of such a special casing or shroud is not only extremely expensive, but also means that the subject of testing does not correspond to a real engine, despite all efforts to minimise the differences between a real engine and the test bed engine with its special casing. For instance, the presence of the probes themselves affects the behaviour of the engine, eg changing thermal capacities etc., and of course capacitance probes cannot measure movements of the liner or casing to which they are grounded. Capacitance probes thus give information which is problematic to relate to production build standards of the engine concerned.

Other types of tip clearance sensors have also been proposed. For example inductive, optical and eddy current sensors have been proposed. However, these alternative probes also involve substantially the same disadvantages as capacitance probes.

It has also been proposed to use techniques which do not involve adaptation or alteration of an engine from its production build standard form, ie without the presence of special probes. Such techniques have involved the use of high energy X-ray sources, or other techniques such as positron emission technology (PET), to produce images of running engines. In one proposal (cf Transparent Engines at Rolls Royce, P A E Stewart, The Rolls Royce Magazine, No 2, September 1979) films of a running engine taken by X-ray were placed on a co-ordinate table and viewed by TV camera, then sampled along eg a vertical sampling line to attempt to measure the turbine seal gap or blade tip clearance. In a later review (Advances in Studying the Internal Behaviour of Gas Turbine Engines, The Rolls Royce Magazine, No 35, December 1987) several types of imaging, including X-ray and PET imaging, are discussed. However, these proposed or described imaging techniques have not found favour in practice for carrying our measurements for example of blade tip clearances, it is believed because of difficulties experienced in correct interpretation of the images and thus the reliable derivation of accurate measurement values.

According to the present invention there is provided an image-based measurement system, comprising:— active imaging means operable to provide an active image of a subject of measurement, showing the subject when active or in use, reference image means operable to provide a reference image of the subject of measurement, the reference image being of an image type different from the active image, image combining means operable to combine the reference image and the active image, matched in scale and keyed together, and image measurement means operable to effect measurement of the active image relative to the reference image, to provide measurements of dimensions of components and/or spacings between components of the subject of measurement, when active or in use.

According to the present invention there is also provided an image-based measurement method, comprising:— providing an active image of a subject of measurement, showing the subject when active or in use, providing a reference image of the subject of measurement, the reference image being of an image type different from the active image, combining the reference image and the active image, matched in scale and keyed together, and effecting measurement of the active image relative to the reference image, to provide measurements of dimensions of components and/or spacings between components of the subject of measurement, when active or in use.

In a preferred embodiment of the invention active images of a subject of measurement, eg a running gas turbine engine, are acquired on X-ray film plates, using X-rays from any suitable X-ray source. These active images may show the engine in different running conditions, eg generating different levels of thrust. The images on the plates are then digitised, for example by use of a camera or high quality radiographic scanner. Once available on a suitable platform, such as a PC or a Unix based system, the films can be turned into movies, and/or treated as individual frames or images.

The provision of such movies, for instance endless animated loops showing movements of engine parts, can be invaluable in allowing the user to appreciate the dynamic changes which take place in the running engine, for example over a range of thrust levels, and to identify particular regions of interest or possible problem zones in the engine. They can also assist for instance in adjusting the images relative to one another to remove aspects of movement of engine parts between different levels of thrust which are of no interest for the purpose of measurement or which may make measurement more difficult (eg relative axial displacements due to thrust).

A frame or framework of a CAD model of the engine—or of relevant parts of the engine—is then superimposed onto the radiographic image(s) to provide datum edges. That is, the X-ray derived images are combined with CAD model images for the purpose of measurement. It is then possible, using the combined images, to employ a suitable video measuring program to accurately measure differences of, for example blade tip clearance, between the dynamic (ie active or running) and cold conditions.

In the combination of a CAD model image with the X-ray or radiographic images, as indicated above the CAD image provides datum edges or points to which measurements can be referred. Rather than attempting measurements within individual X-ray images and deriving differences between such measurements for different X-ray images, measurements are effected in respect of each X-ray image relative to the same CAD image datum point or line. Thus, the measurement effected in each case is a kind of combined image measurement based on the two types of images provided.

This combined image measurement technique greatly facilitates measurements, promotes accuracy and removes or minimises any problems of (X-ray) image interpretation.

Using such a combined image measurement technique, it is also possible to measure components not normally seen by X-ray, by building part images with X-ray and part with CAD.

Measurement using a combined image technique in accordance with the present invention, for example combined X-ray and CAD images, enables non-invasive measurement and requires no specialised parts to be provided or installed on the subject of measurement.

Using measurement based on combined images (eg X-ray/ CAD images) information closely corresponding to production standards can be obtained.

In the context of clearance measurements in turbine engines, measurements based on combined images (eg X-ray/ CAD) can be used for measurement of both blade and liner movements, and even nozzle guide vane movements.

Compared with capacitance probe measurement techniques, involving special constructions an installation of invasive probes, very significant costs savings can be made per engine, or engine type, to be investigated, simply in terms of labour costs. Of course, machining costs and all associated costs for producing special constructions and installing probes are avoided. Lead times to measurement results, and hence engine design finalisation in the case of prototype testing, can be reduced. Time on test for an engine or engine type can be reduced. Since no special constructions or probes are needed, each individual engine can be tested and subject to measurement, providing 100% quality control. This also leads to environmental cost improvements. More generally, by means of measurement at different operating points, full thermal model evaluation of an engine can be effected. The results of offer ready Internet capability and full program integration of software.

The advantages of the present invention apply not only when the subject of measurement is a component of a turbine engine (or tip clearance in such an engine). These advantages can also apply when the subject of measurement is any mechanical system which is not readily accessible for direct measurements, such as a piston engine for a motor vehicle, provided that it can be imaged in a running or operating condition by some means such as X-rays or other non-invasive imaging procedures.

The present invention further provides an image-based measurement system or method in which active images of a subject of measurement can be used to derive a reference image, for example a CAD design image.

Embodiments of this further aspect of the present invention can be employed for reverse engineering, as discussed in more detail below. This reverse engineering capability can be extremely valuable for the design and production of suitable spare or replacement engine parts.

FIG. 10 is a table summarising measured quantities relating to tip clearance reductions for different operating points of an engine, which are the basis of the graph of FIG. 8.

Figure 1:
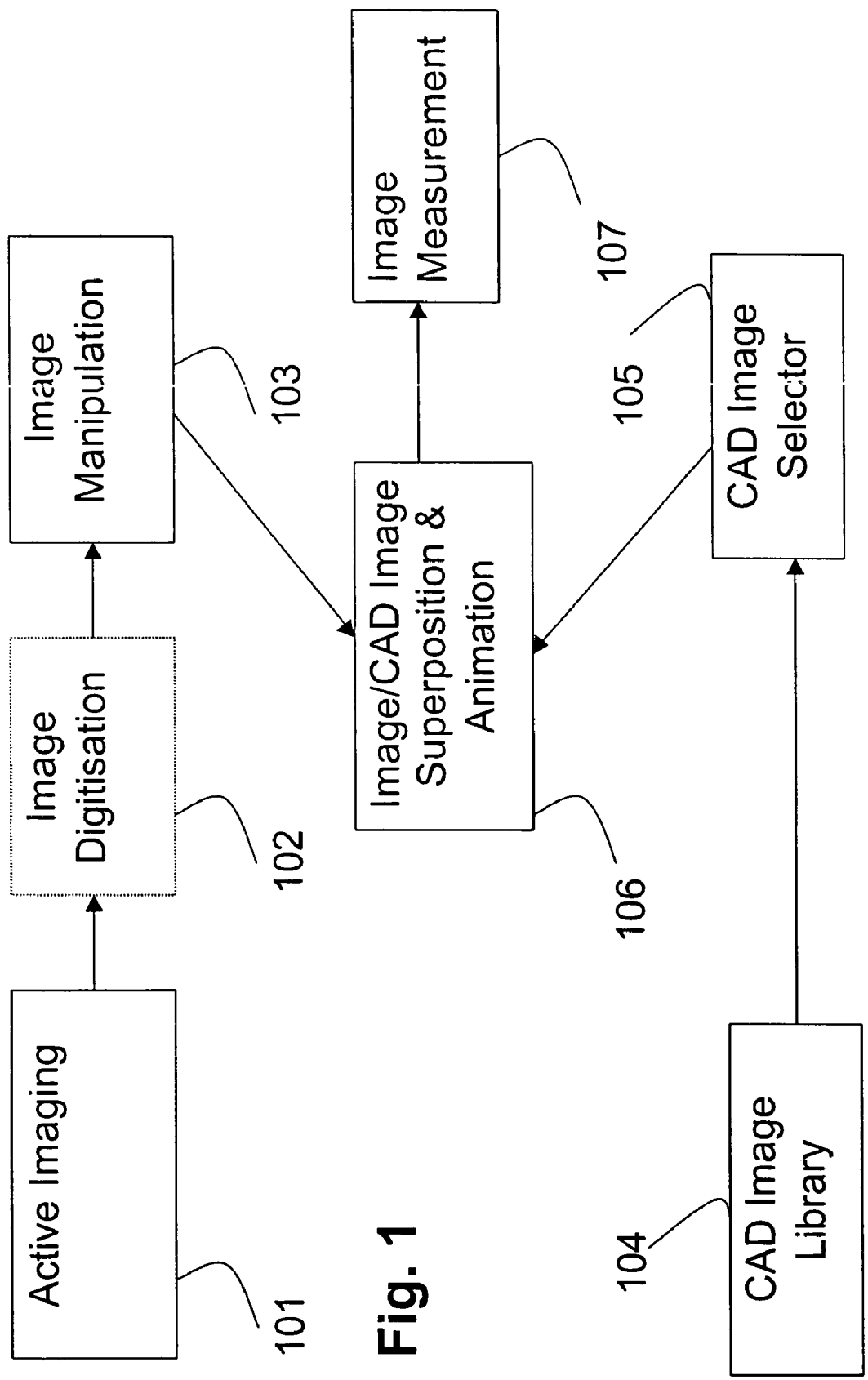
FIG. 1 is a schematic block diagram of a system in accordance with an embodiment of the invention.

The block diagram of FIG. 1 schematically illustrates main components of a system in accordance with an embodiment of the present invention, for effecting measurements of parts of a mechanical system.

An active imaging device or unit 101 is capable of generating images of a subject of measurement, or at least a relevant portion of the subject of measurement, for example images of a portion of a gas turbine engine comprehending blade tips and neighbouring casing parts where blade tip clearance is the target of investigation, when the subject of measurement is in operation. This imaging device or unit may be, for example, an X-ray imaging unit. Other imaging techniques, for example acoustic techniques, PET techniques, NMR techniques, etc may be used, as appropriate for the subject of measurement concerned.

If necessary, the images acquired by the device or unit 101 are subject to digitisation in a digitisation unit 102. For example, if the active imaging device 101 is an X-ray unit and the images provided are in the form of X-ray plates or films, these are scanned or otherwise converted to digital format by the unit 102. Where the unit 101 provides digitised images, of course, digitisation unit 102 can be omitted.

Acquired and digitised images of the subject of measurement can then be manipulated as necessary by an image manipulation device or unit 103. For example, in the case of tip clearance measurement of a gas turbine engine there arise relative displacements of parts of the engine which are not relevant for the measurements to be carried out or can complicate those measurements. For instance, different levels of thrust generated by the engine lead to different relative axial displacements of engine parts. These displacements can make it difficult to measure tip clearances. However, the image manipulation unit 103 can effectively overlay digital images obtained at different levels of thrust, adjusting image alignment to cancel out thrust-related displacements.

Alongside the active imaging of the subject of measurement, for example a gas turbine engine, a second image source is employed, in this embodiment a CAD image library 104 holding CAD images of the engine design of the engine which is the subject of measurement. A CAD image selector 105 selects a CAD image appropriate for the engine or part of the engine which is the subject of measurement.

In an image superposition device or unit 106, the digitised X-ray images and the CAD image are superposed, so that the CAD engine design framework overlays the X-ray images.

The overlaying can generally be effected by the unit 106, the unit being operable to appropriately scale and key the X-ray and CAD images into register with one another, ie to calibrate the X-ray and CAD images relative to one another. This may be effected automatically using image analysis techniques to identify corresponding features in the X-ray and CAD images, from which scaling and keying together of the images can be effected. Alternatively, a baseline X-ray image may be employed which contains features (such as a fiducial tungsten marker) indicating the scale and extent of this baseline image, and all subsequent active images of the subject of measurement at least for the imaging run concerned. This baseline image can then serve for scaling and keying, i.e. relative calibration. As a further alternative, steps may be taken to ensure that each X-ray image contains unambiguous calibration features.

If necessary, the user can intervene and assist in final relative calibration of the X-ray and CAD images.

With an embodiment of the invention it may be provided that the unit 106 is able to combine a series of X-ray images into a kind of video loop or movie, such that the images are given a form of animation and can be viewed in animated form by the user. This animation can assist for example in image manipulation to remove thrust effects, and in final relative calibration of the X-ray and CAD images.

An image measurement unit of device 107 can then effect measurements on the combined X-ray and CAD images.

In the combination of a CAD model image with the X-ray or radiographic images, the CAD image provides datum edges or points to which measurements can be referred. Rather than attempting measurements within individual X-ray images and deriving differences between such measurements for different X-ray images, measurements are effected in respect of each X-ray image relative to the same CAD image datum point or line. Thus, the measurement effected in each case is a kind of combined image measurement based on the two types of images provided.

This combined image measurement technique facilitates measurement and measurement accuracy, and means that measurements can be effected in relation to substantially all engine parts, eg not only blade tips but also the surrounding casing or shroud, which is not possible with capacitive probes.

The results of measurement can then be analysed by any suitable means.

Figure 2:
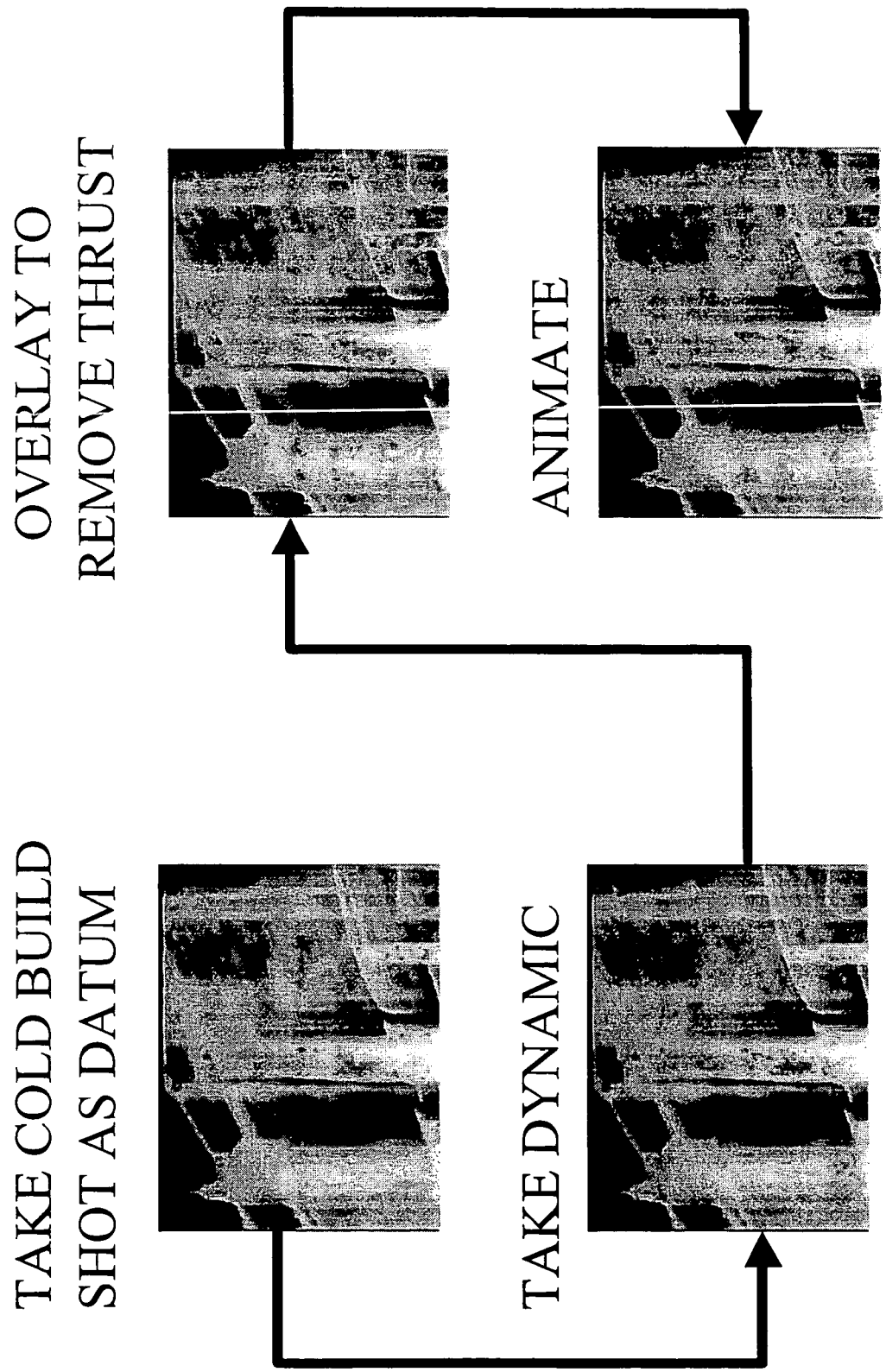
FIG. 2 is a pictorial flow chart illustrating steps in a method in accordance with the present invention, employing X-ray imaging.

FIG. 2 illustrates, in a pictorial flow chart, steps in a method according to an embodiment of the invention. X-ray images, in this example, of the engine which is the subject of measurement are obtained, for instance as described above by digitisation of X-ray plates. A first X-ray image is a cold build shot, ie an image of the engine in a static, non-running condition. A second X-ray image, a dynamic shot, is taken with the engine in a dynamic or running condition, at a selected level of thrust. Further dynamic shots can be taken at different levels of thrust. Then, the static and dynamic shots are overlaid to remove the effects of thrust, eg axial relative displacements of different engine components.

At this point, a sequence of X-ray images can be animated in the manner of an endless video loop, which can be displayed to a user. This animation can be extremely helpful in enabling the user to identify relative movements of parts of the engine or changes of clearances, which may not be apparent if the X-ray images are inspected one by one in a static manner. This can help the user in identifying particular regions or clearances to be selected as a subject of quantitative measurement. As mentioned above, this can also be useful for image adjustment to remove the effects of thrust, and for calibration between X-Ray and CAD images.

The X-ray images may then be combined with a CAD image, and measurement effected as described above.

Figure 3A:
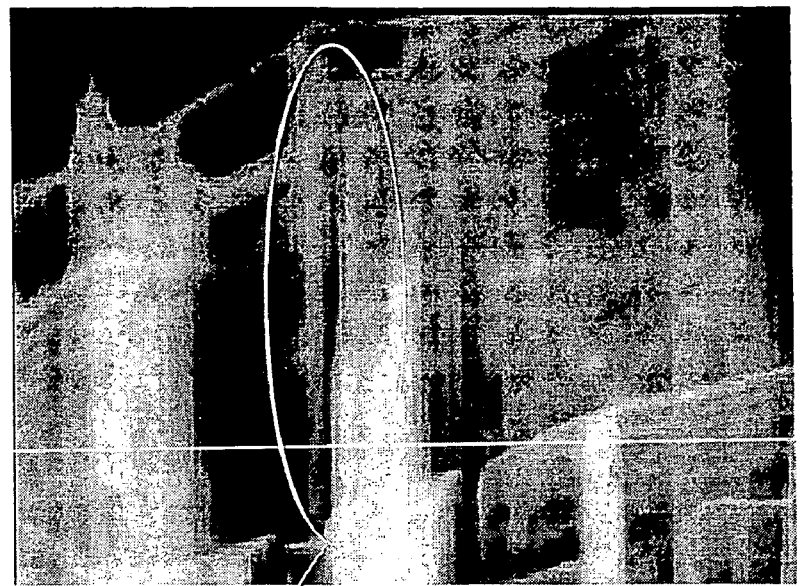
FIGS. 3a and 3b are details of X-ray images illustrative of changes in engine component spacing which can be imaged by the present invention.
Figure 3B:
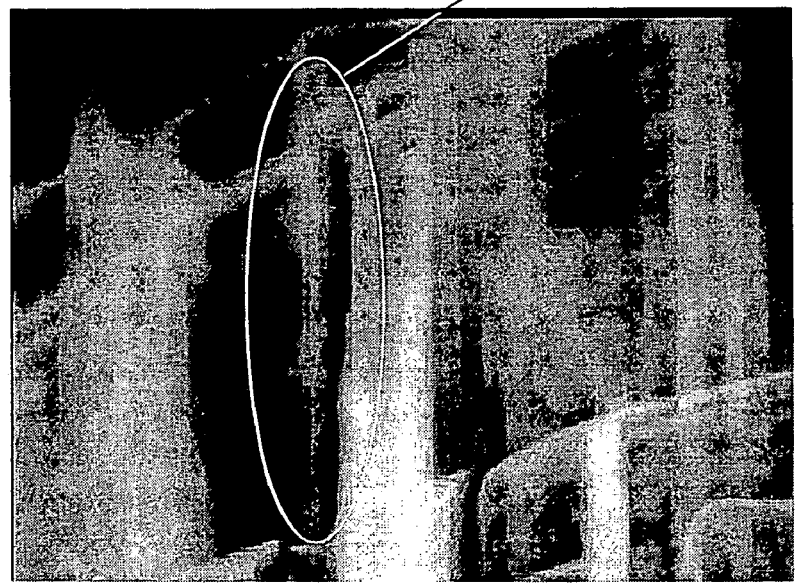
Figure 4A:
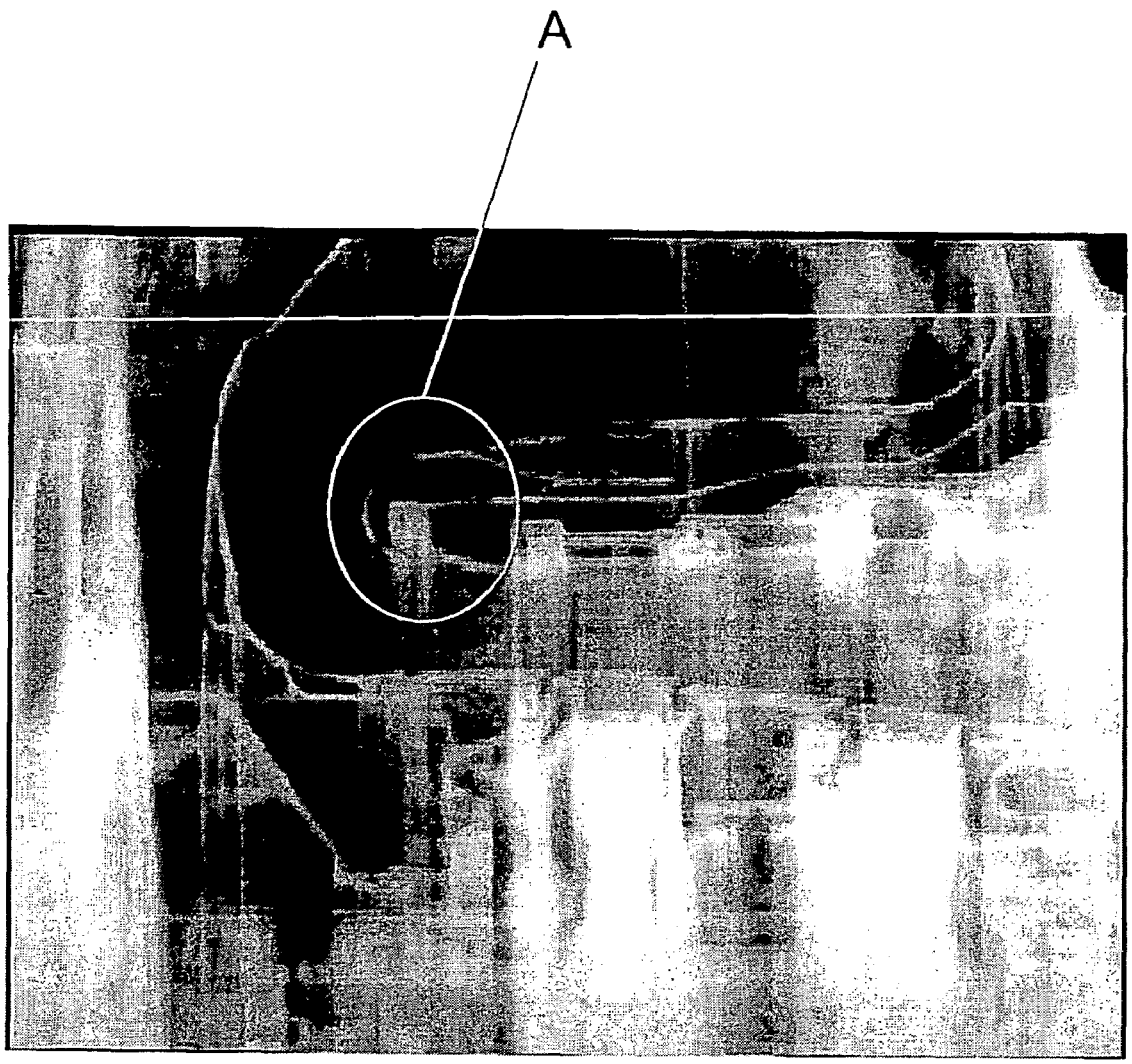
FIGS. 4a and 4b are details of further X-ray images illustrative of changes in engine component spacing which can be imaged by the present invention.
Figure 4B:
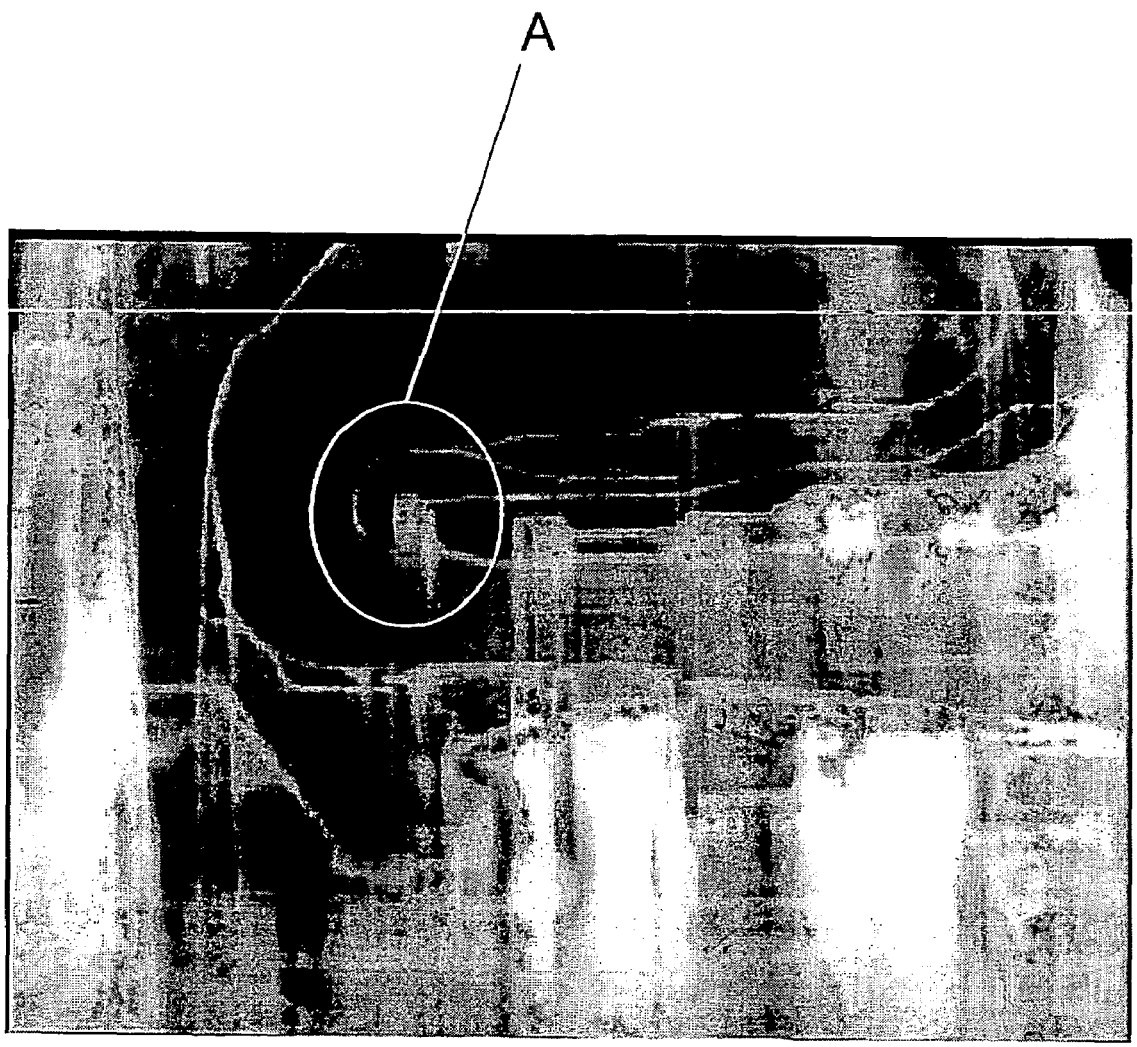

FIGS. 3A and 3B show, by way of example, X-ray images of part of an aero engine obtained in the use of the present invention, the detail marked A showing a region in which a change of clearance is manifest. FIGS. 4A and 4B similarly examples of X-ray images of part of an aero engine obtained in the use of the present invention, the details marked A again corresponding to a region in which a change of disposition is manifest.

Although, from the still images of FIGS. 3A and 3B, and 4A and 4B, only relatively gross changes are readily apparently, by using the animation technique described above, running the images in a repeating video loop, other more subtle changes become apparent. As indicated above, this animation technique can be extremely useful inter alia in identifying regions of interest or possible problems.

Figure 5:
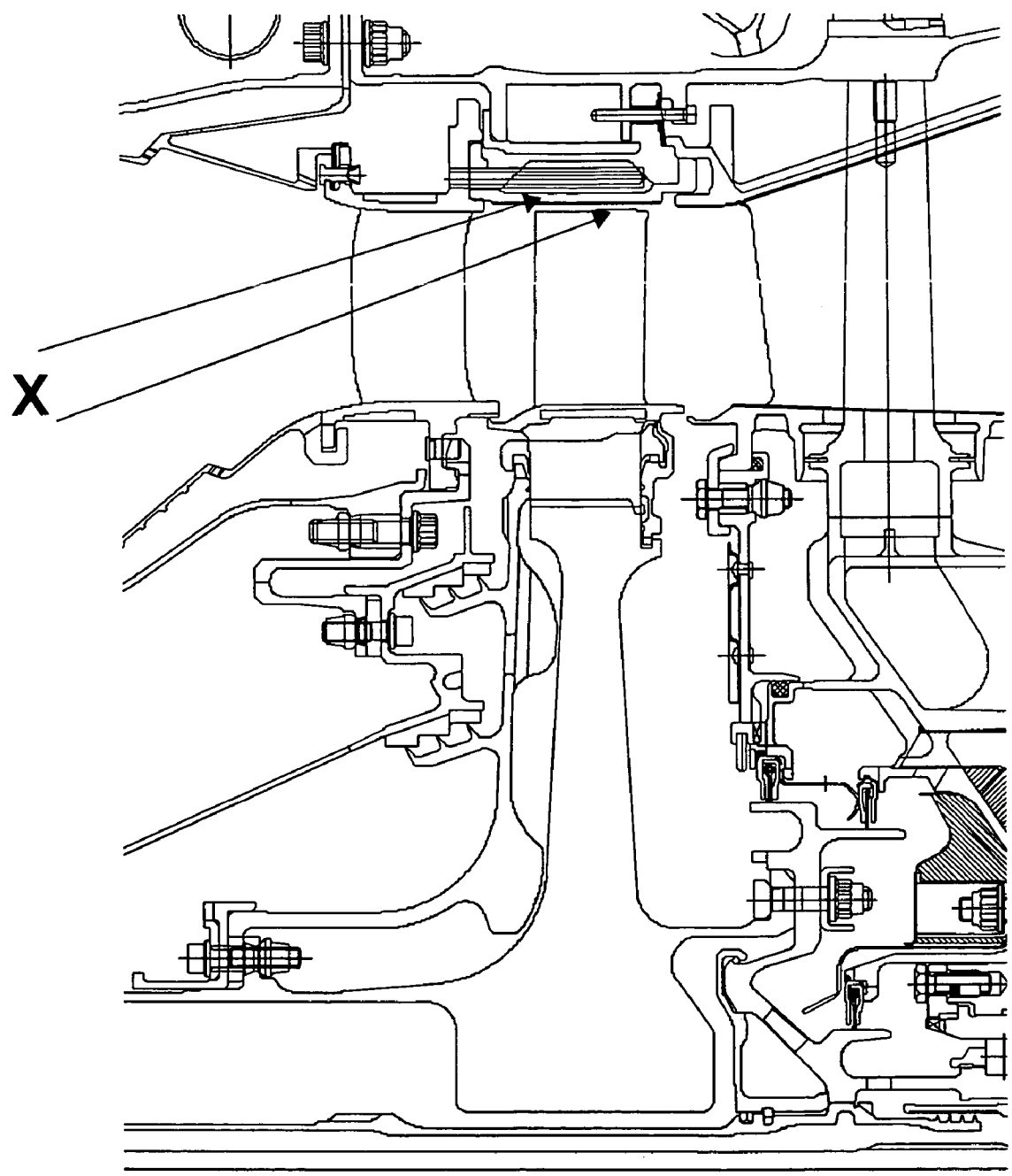
FIG. 5 is a schematic of part of an engine, representing a CAD design framework.
Figure 6:
FIG. 6 illustrates a CAD image of a detail of the engine of FIG. 5.

FIG. 5 is an illustration of part of a CAD design framework or model of part of an aero engine. Here, a tip clearance zone of interest, designated X, is indicated by arrows. FIG. 6 then shows a screen CAD image outline of the relevant part of the engine, with the clearance zone of interest.

Figure 7:
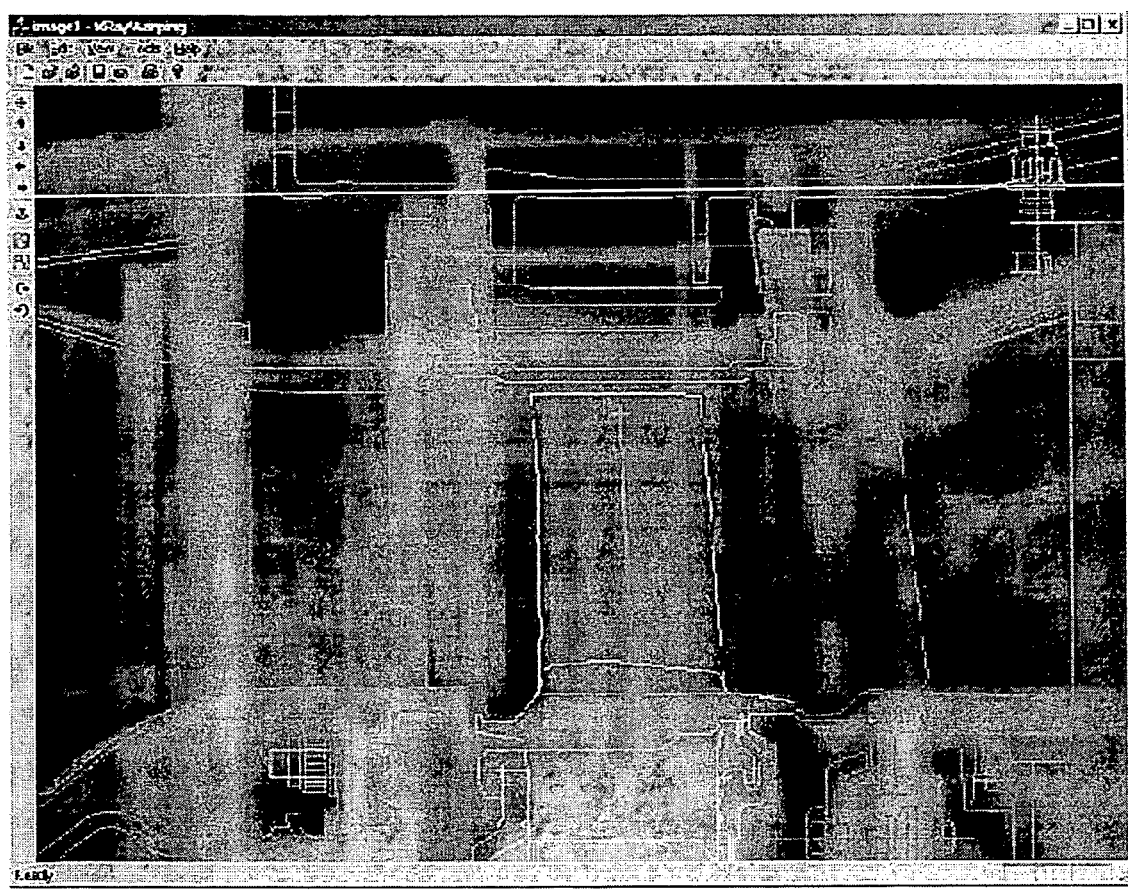
FIG. 7 illustrates a screenshot of CAD image superposed on an X-ray image of the active or running engine.

FIG. 7 is a screenshot showing the CAD image superposed on an X-ray image, as can be displayed to a user.

As indicated above, X-ray images can be animated and they can be displayed to the user with the superposed CAD image. This can be useful for the purposes mentioned above, but can also allow the user to obtain an invaluable visual impression of the behaviour of the engine. This qualitative impression, with the ability to simply identify potential problem zones in the structure of the engine, can provide the user with information as useful as a printout of spreadsheet of quantitative numerical values.

Figure 8:
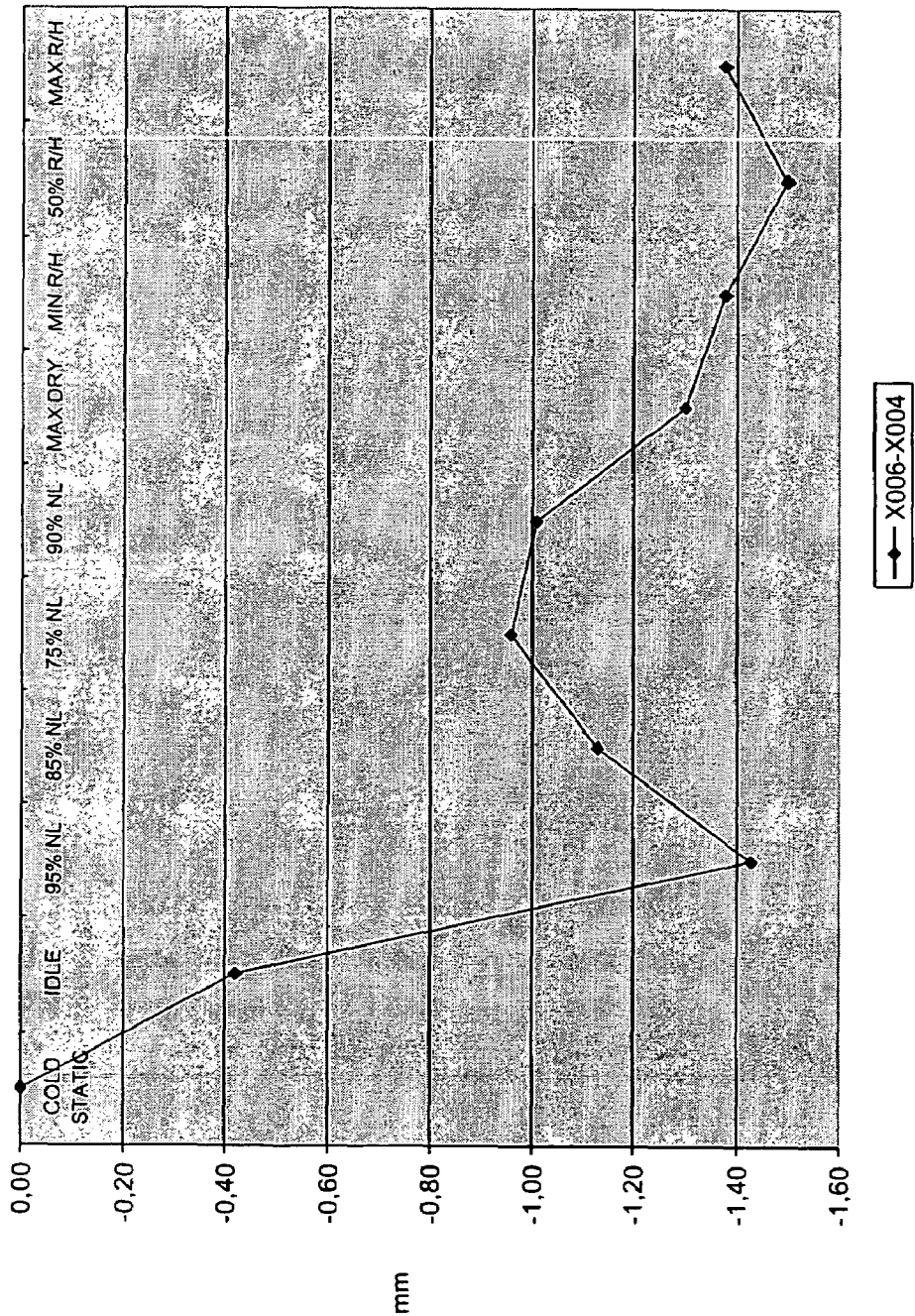
FIG. 8 is a graph illustrating measured tip clearance reductions for different operating points of an engine, obtained using the present invention.
Figure 9:
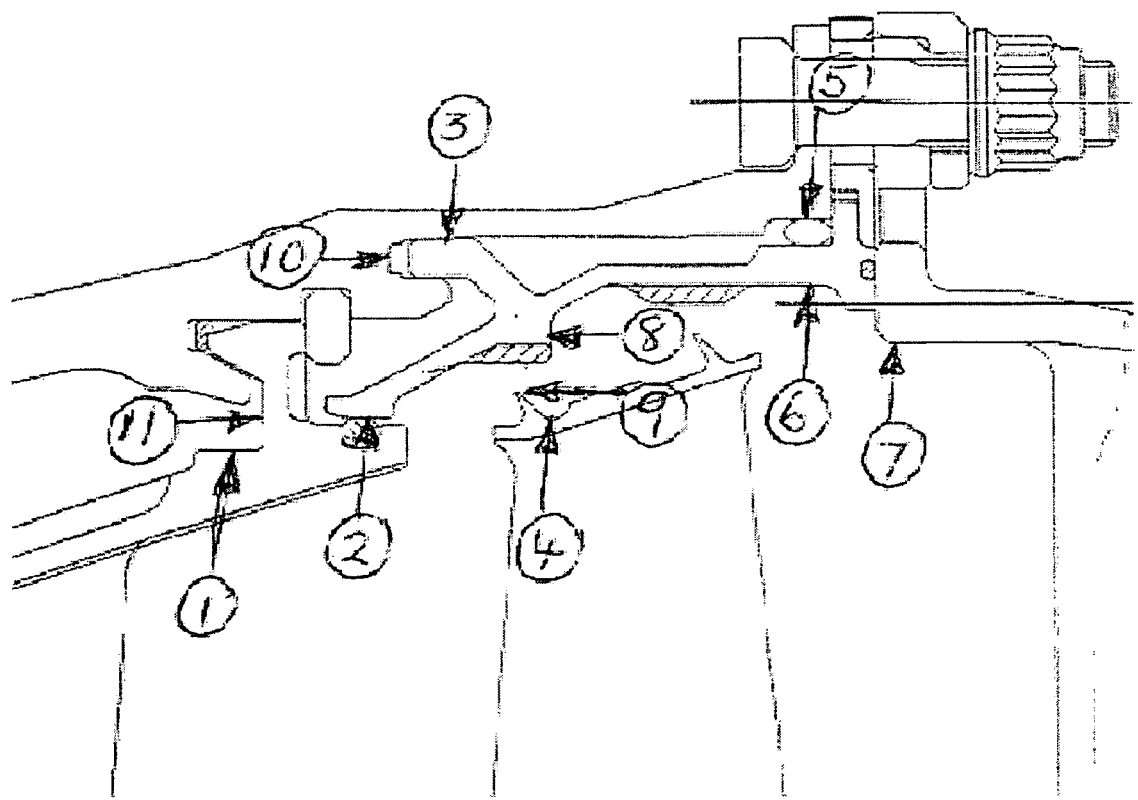
FIG. 9 is a schematic illustration of details of engine construction.

FIGS. 8, 9 and 10 provide an illustration of measurement results which can be achieved by means of the present invention.

FIG. 8 is a graph showing measured tip clearance values (mm) for an aero engine over a range of operating conditions, ie (i) cold static (engine not running), (ii) idle. (iii) 95% NL [normalised LP (Low Pressure) spool speed; maximum=100% NL], (iv) 85% NL, (v) 75% NL, (vi) 90% NL, (vii) Max Dry [Maximum Dry], (viii) Min R/H [Minimum Re-heat], (ix) 50% R/H and (x) Max R/H.

FIG. 9 is a schematic diagram which indicates typical areas of interest for measurements, such as tip clearance measurements in an aero engine, the areas being numbered 1 to 11.

FIG. 10 is a table summarising measured quantities relating to tip clearance reductions for different operating points of an engine, which are the basis of the graph of FIG. 8. The table shows measured values for various areas of the engine, X001 to X006, corresponding to the areas numbered 1 to 6 in FIG. 9. It will thus be appreciated that values can be measured not only, for example, for blade tips, but also for areas of the surrounding engine components. The graph of FIG. 8 illustrates by way of example the distance or clearance between areas X006 (6 in FIG. 9) and X004 (4 in FIG. 9), shown calculated in the lower right column of the Table, by subtraction of the measured values for those areas seen in the upper part of the table.

The labels 8705 to 8716 correspond to the operating conditions as indicated above and as listed in the lower left part of the Table.

The above-described examples of embodiments of the invention serve the purpose of ensuring that the behaviour or performance of a subject of measurement, eg blade tip clearance in a gas turbine engine, conforms to design parameters when the engine is in an active or running condition, using combined image measurement based on, for example, X-ray images of a running engine and CAD design images of the static (designed) engine structure.

Embodiments of a further aspect of the present invention may, however, be used for determining design parameters of parts of a subject of measurement, eg an engine, where those parameters are unknown. In effect, embodiments of the present invention can be employed for reverse engineering. This ability to reverse engineer can be extremely useful for example in the context of the production of correctly dimensioned replacement or spare parts for systems, such as engines, for which design details are not known.

Figure 11:
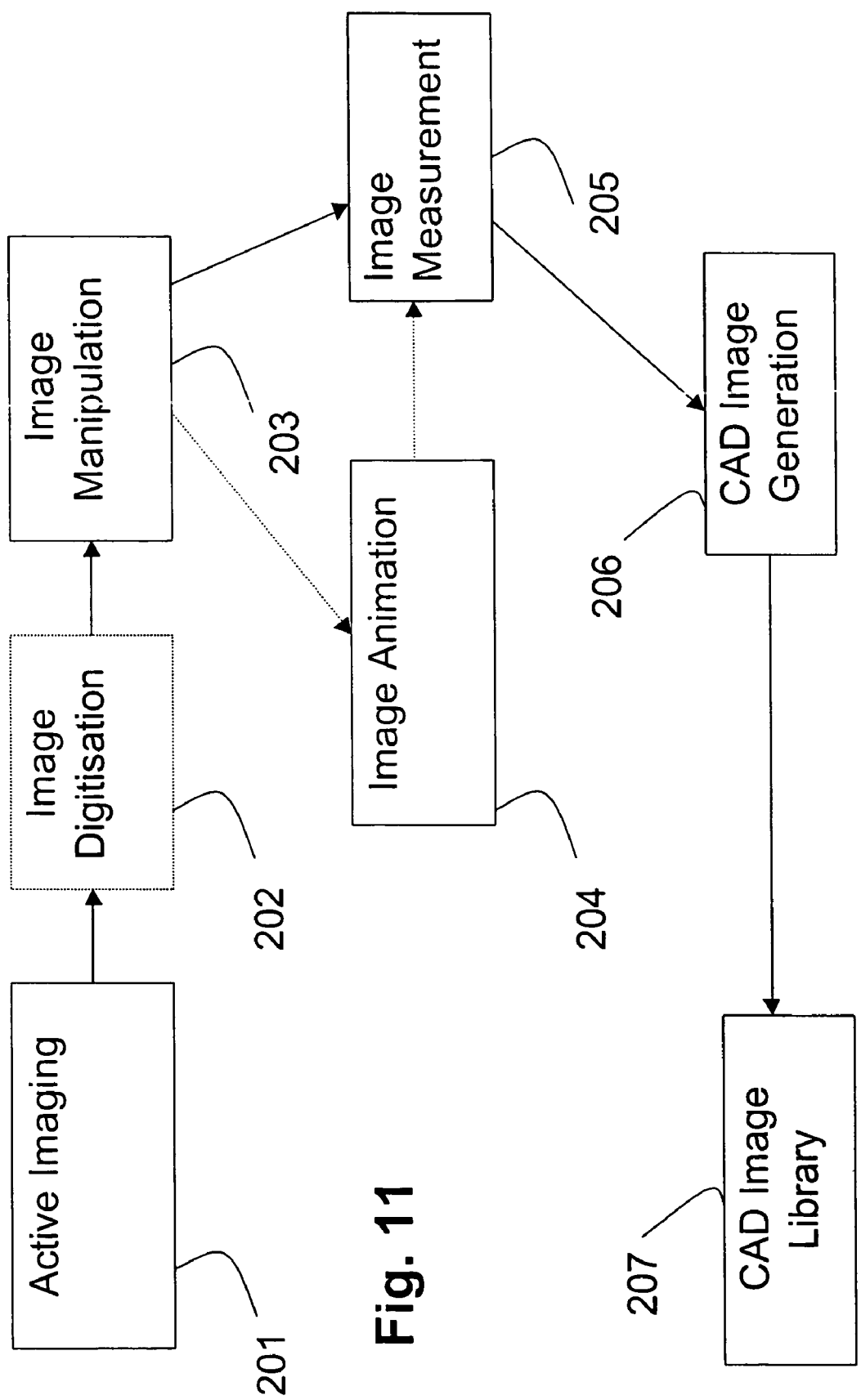
FIG. 11 is a schematic block diagram of a further system in accordance with a further aspect of the invention, which can be employed for reverse engineering.

FIG. 11 illustrates and example of an aspect of the present invention for reverse engineering purposes.

In this aspect of the invention active imaging, for example X-ray imaging of running aero engine is effected by a unit 201 as in the case of the embodiment of the present invention described with reference to FIG. 1. Image digitisation is then effected, if necessary, in a unit 202 and images the manipulated in unit 203, for example to remove axial thrust displacements. From the resultant images, measurements can be effected by an image measurement unit 205, taking into account the dynamic behaviour of the engine, and used in a CAD image generation unit 206 to generate a CAD image of the relevant part or parts of the engine, which can then be stored in a CAD image library 207. CAD image generation may take place automatically on the basis of image analysis by the system, but a user may also assist in establishing datum points or regions for use in the CAD image generation.

The system may also include an image animation unit 204 to animate the images as described above, for example to assist in the establishment of datum points or regions for use in generation of the CAD image of the relevant part or parts.

In a further procedure, the CAD image may then be used as described in connection with FIG. 1, for combined image measurements, for example of tip clearances, to verify that the CAD image will provide a part which will comply with requirements of the engine. Compliance failures may be quantified, ie measured, and used to adapt the CAD image. This process may be iteratively repeated.

Alternatively, the unit 206 may generate a CAD image of the relevant part or parts of the engine by selecting from the CAD image library a library image which best fits to the X-ray images of the engine, where the library includes CAD images of a broad range of engines and engine parts. Iterative adaptation of the CAD image then taking place as indicated above.

This reverse engineering aspect of the invention can be useful for obtaining CAD information to enable spare or replacement parts to be produced where no information on part dimensions or example parts are available, without incurring the very significant cost of disassembling an engine.

Although examples of embodiments of the present invention have been described in which active or running images of the subject of measurement are obtained by use of X-rays, it will be understood that active or running images can be obtained by any other technique which is suitable for use with the subject of measurement in question. For example, active or running images may be obtained using positron emission techniques, acoustic or ultrasonic techniques, or and other suitable non-invasive imaging technique.

Although examples of embodiments of the present invention have been described in the context of tip clearance measurement in turbine engines, it will be appreciated that the invention has wider application and that the combined image measurement techniques of the present invention can be put to use in other fields, particularly for measuring mechanical systems which are inaccessible to direct measurement when in an operating condition.

By way of example, combined image measurement in accordance with the invention can be used to compare the behaviour of an implanted prosthesis, for example an artificial joint, under various load conditions in the human body, with design expectations of the prosthesis. This can be used to assess dynamic behaviour of the joint, for example to identify undesired points of wear or contact between mutually moving parts etc.

The invention claimed is:

1. An image-based measurement system for measuring subjects in a dynamic state or in use, the image-based measuring system comprising:
   an active imaging means for providing an active image by actively imaging a subject of measurement,
   wherein the subject of measurement is actively imaged while in a dynamic state or in use,
   a reference image means that provides a reference image of the subject of measurement, the reference image being of an image type different from the active image,
   an image combining means that combines the reference image and the active image, matched in scale and keyed together, and
   an image measurement means that measures the active image relative to the reference image, and provides measurements of dimensions of components and/or spacings between components of the subject of measurement, when the subject of measurement is in a dynamic state or in use.

2. A system as claimed in claim 1, wherein the active imaging means provides an X-ray image of the subject of measurement.

3. A system as claimed in claim 1, wherein the reference image means provides a CAD reference image.

4. A system as claimed in claim 1, wherein the active imaging means provides a plurality of active images of the subject of measurement, each active image corresponding to a different dynamic or use state of the subject of measurement, and the image combining means combines the plurality of active images and animates the plurality of active images to a moving picture representation of the subject of measurement.

5. A system as claimed in claim 1, wherein the active imaging means provides an active image of a running turbine engine, the reference image means provides a CAD image of the turbine engine, and the image measurement means effects measurements of blade tip clearances.

6. A system as claimed in claim 1, further comprising a reference image generation means that provides, on the basis of the measurements provided by the image measurements means, a generated reference image of the component of the subject of measurement the generated reference image being of an image type different from the active image and corresponding to a design image of the component of the subject of measurement while in a dynamic state or in use.

7. A system as claimed in claim 6, wherein the reference image generation means provides the generated reference image by selection from a library of reference images, based on a best fit to the measurements provided by the image measurements means.

8. A system as claimed in claim 6, wherein the image measurement means effects measurement of the active images relative to the generated reference image to provide measurements of deviations between the active images and the reference image, and the image generation means in response to unacceptable deviations provides an updated reference image.

9. An image-based measurement method for measuring subjects in a dynamic state or in use, the method comprising:
providing an active image of a subject of measurement, showing the subject of measurement while in a dynamic state or in use,
providing a reference image of the subject of measurement, the reference image being of an image type different from the active image,
combining the reference image and the active image, matched in scale and keyed together, and
effecting measurement of the active image relative to the reference image, to provide measurements of dimensions of components and/or spacings between components of the subject of measurement, while in a dynamic state or in use.

10. A method as claimed in claim 9, wherein the active image is an X-ray image of the subject of measurement.

11. A method as claimed in claim 9, wherein the reference image is a CAD image.

12. A method as claimed in claim 9, wherein a plurality of active images of the subject of measurement are provided, each active image corresponding to a different dynamic or use state of the subject of measurement, and these images are animated to a moving picture representation of the subject of measurement.

13. A method as claimed in claim 9, wherein an active image of a running turbine engine is provided, the reference image is a CAD image of the running turbine engine, and measurements of blade tip clearances are effected.

14. A method as claimed in claim 9, further comprising providing a generated reference image of the component of the subject of measurement on the basis of the measurements provided by the effecting measurement of the active image relative to the reference image, the generated reference image being of an image type different from the active image and corresponding to a design image of the component of the subject of measurement while in a dynamic state or in use.

15. A method as claimed in claim 14, wherein the generated reference image is generated by selection from a library of reference images based on a best fit to the measurements based on the active images.

16. A method as claimed in claim 14, wherein measurements of the active images relative to the generated reference image are effected to provide measurements of deviations between the active images and the reference image, and in response to unacceptable deviations an updated reference image is provided.

17. An image-based measurement system for measuring subjects in a dynamic state or in use, the image-based measurement system comprising:
active imaging means for providing an active image by actively imaging a subject of measurement while in a dynamic state or in use, and/or in different dynamic or use states,
image measurement means that effects measurements based on the active images,
reference image generation means that provides a reference image of the subject of measurement on the basis of the measurements provided by the image measurement means, the reference image being of an image type different from the active image and corresponding to a static design image of at least a component of the subject of measurement.

18. A system as claimed in claim 17, wherein the reference image generation means provides the reference image by selection from a library of reference images, based on a best fit to the measurements provided by the image measurement means.

19. A system as claimed in claim 17, wherein the image measurement means effects measurement of the active images relative to the generated reference image, to provide measurements of deviations between the active images and the reference image, and the reference image generation means provides in response to unacceptable deviations an updated reference image.

20. A system as claimed in claim 17, wherein the active imaging means provides X-ray images of the subject of measurement.

21. A system as claimed in claim 17, wherein the reference image generation means provides a CAD reference image.

22. A system as claimed in claim 17, wherein the active imaging means provides active images of a running turbine engine, the reference image providing a CAD image of the running turbine engine.

23. An image-based measurement method for measuring subjects in a dynamic state or in use, the method comprising:
providing active images of a subject of measurement showing the subject of measurement while in a dynamic state or in use, and/or in different dynamic or use states,
effecting measurements based on the active images,
generating, on the basis of the measurements, a reference image of the subject of measurement, the reference image being of an image type different from the active image and corresponding to a static design image of at least a component of the subject of measurement.

24. A method as claimed in claim 23, wherein the reference image is generated by selection from a library of reference images, based on a best fit to the measurements based on the active images.

25. A method as claimed in claim 23, wherein measurements of the active images relative to the generated reference image are effected, to provide measurements of deviations between the active images and the reference image, and in response to unacceptable deviations an updated reference image is provided.

26. A method as claimed in claim 23, wherein the active images means are X-ray images of the subject of measurement.

27. A method as claimed in claim 23, wherein the reference image is a CAD reference image.

28. A method as claimed in claim 23, wherein the active images are images of a running turbine engine, and the reference image is a CAD image.

* * * * *